United States Patent
Lee et al.

(10) Patent No.: US 8,052,958 B2
(45) Date of Patent: Nov. 8, 2011

(54) METHOD FOR MANUFACTURING METAL OXIDE HOLLOW NANOPARTICLES AND METAL OXIDE HOLLOW NANOPARTICLES MANUFACTURED BY THE SAME

(75) Inventors: Jai Sung Lee, Seoul (KR); Chang Woo Lee, Kyungki-do (KR); Sung Soon Im, Seoul (KR)

(73) Assignee: Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 11/290,702

(22) Filed: Nov. 29, 2005

(65) Prior Publication Data
US 2006/0269463 A1    Nov. 30, 2006

(30) Foreign Application Priority Data
May 27, 2005    (KR) .................. 10-2005-0045219

(51) Int. Cl.
*C01G 49/02* (2006.01)
*B01D 53/14* (2006.01)
*B01D 53/56* (2006.01)
*C01C 3/00* (2006.01)
*C10L 1/24* (2006.01)
*C10L 1/18* (2006.01)

(52) U.S. Cl. .......... 423/632; 423/236; 44/362; 977/733; 977/775

(58) Field of Classification Search .............. 423/263, 423/236; 44/300, 354, 358, 362; 977/773–775
See application file for complete search history.

(56) References Cited

U.S. PATENT DOCUMENTS
2006/0269463 A1 * 11/2006 Lee et al. ............. 423/263

OTHER PUBLICATIONS

Material Safety Data Sheet. Copper (II) Acetylacetonate. Fisher Scientific. (1997).*
Chang et al. Nanostructure ceramics synthesized by chemical vapor condensation. Nanostructured Materials, vol. 6, pp. 321-324, 1995.*
Jensen et al. "Preparation of ZnO—Al2O3 particle in a premixed flame". Journal of Nanoparticle Research 2: 363-373, 2000.*
Yadong et al. "Formation of hollow nanocrystals through the nanoscale Kirkendall effect". Science 304: 711-714, 2004.*
Chang et al. "Nanostructured ceramics synthesized by chemical vapor condensation". Nanostructured Materials, vol. 6, pp. 321-324, 1995.*
Lee, Jai-Sung, et al. "Hollow Nanoparticles of Iron Oxide Synthesized By Chemical Vapor Condensation," Journal of Nanoparticle Research (2004), 6:627-631 DPI: 10.1007/sl 1051-004-6322-8.
Nasibulin et al., *J. Aerosol. Sci.*, 31(Suppl. 1):S913-S914 (2000).

* cited by examiner

*Primary Examiner* — Jerry Lorengo
*Assistant Examiner* — Jennifer A Smith
(74) *Attorney, Agent, or Firm* — Perkins Coie LLP

(57) ABSTRACT

Provided is a method for manufacturing a metal oxide hollow nanoparticles with excellent properties more easily and simply by a chemical vapor condensation employing metal β-diketonates as precursors, and a metal oxide hollow nanoparticles manufactured by the method. The method includes: preparing metal β-diketonate as a precursor; evaporating the metal β-diketonate at a predetermined temperature higher than a melting point of the metal β-diketonate; transferring the evaporated metal β-diketonate into a reaction region; thermally decomposing the transferred gaseous metal β-diketonate and simultaneously inducing a reaction of the transferred gaseous metal β-diketonate with oxygen to synthesize the metal oxide hollow nanoparticle; and condensing and collecting the synthesized metal oxide hollow nanoparticles.

9 Claims, 16 Drawing Sheets

Gaseous Precursor | Removal of Organic Groups and Nucleation | Removal of Organic Groups and Nuclei Growth | Nanocapsule formation and Shell Unification

METHOD FOR MANUFACTURING METAL OXIDE HOLLOW NANOPARTICLES AND METAL OXIDE HOLLOW NANOPARTICLES MANUFACTURED BY THE SAME

RELATED APPLICATION

The present application is based on, and claims priority from, Korean Application Number 2005-45219, filed May 27, 2005, the disclosure of which is hereby incorporated by reference herein in its entirety.

BACKGROUND OF THE INVENTION

1. Field of the Invention

The present invention relates to a method for manufacturing nanoparticles using a chemical vapor condensation process, and more particularly, to a method for manufacturing metal oxide hollow nanoparticles with excellent properties more easily and simply by a vapor synthesis process employing metal β-diketonate as a precursor, and metal oxide hollow nanoparticles manufactured by the method.

2. Description of the Related Art

Conventional metal oxide hollow particles originated from metal oxide or polymers are mainly applied to carriers of drugs, cosmetics, inks and so on and catalysts. Despite of this wide range of the applications, it is difficult to improve properties of the conventional metal oxide hollow particles because: sizes of the metal oxide hollow particles as manufactured are greater than several hundreds of nanometers; and using conventional synthesis methods, it is difficult to change various functional characteristics that are generally obtained by decreasing the metal oxide hollow particles to the size of less than 100 nm.

The mechanism for forming hollow particles largely relies on the conventional synthesis process. Examples of the conventional synthesis process are: a sol-gel process, which is a liquid phase synthesis method, a spray pyrolysis process, which is a gas phase synthesis method, and a spray drying process.

However, the above processes may cause a change in the microstructure of particles. In the case of the sol-gel process, a heat treatment for removing polymer core particles or interstitial organic materials is accompanied to form hollow structure. During the heat treatment, agglomeration of the particles and particle growth occur due to thermal coagulation of the particles. As a result, it may be difficult to manufacture hollow nanoparticles of less than 100 nm.

In consideration of the particle growth by the heat treatment, numerous studies have been actively continued to form a hollow structure through coating polymer core particles with sizes of several tens of nanometers. However, it may be very difficult to form a coating layer uniformly on the surface of each core particle with the size of less than several tens of nanometers. Therefore, successful synthesis of hollow nanoparticles with sizes of less than 100 nm has not been yet reported.

In the case of the gas phase synthesis processes such as spray pyrolysis process and spray drying process, a nozzle generates droplets of a precursor and, droplet sizes are in several microns. Hence, it may be difficult to manufacture hollow nanoparticles with sizes of less than 100 nm.

SUMMARY OF THE INVENTION

Accordingly, the present invention is directed to a method for manufacturing metal oxide hollow nanoparticles and metal oxide hollow nanoparticles manufactured by the method that substantially obviates one or more problems due to limitations and disadvantages of the related art.

An object of the present invention is to provide a method for manufacturing metal oxide hollow nanoparticles with excellent properties more easily and simply by a gas phase synthesis process employing metal β-diketonate as a precursor, and metal oxide hollow nanoparticles manufactured by the method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for manufacturing metal oxide hollow nanoparticles using chemical vapor condensation process. The method includes: preparing metal β-diketonate as a precursor; evaporating the metal β-diketonate at a predetermined temperature higher than a melting point of the metal β-diketonate; transferring the evaporated β-diketonate into a reaction region; thermally decomposing the transferred metal β-diketonate vapor and simultaneously inducing a reaction of the transferred metal β-diketonate vapor with oxygen to synthesize metal oxide hollow nanoparticles; and condensing and collecting the synthesized metal oxide hollow nanoparticle.

In another aspect of the present invention, there is provided metal oxide hollow nanoparticles manufactured by the above-described method.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings.

According to the exemplary embodiment of the present invention, metal oxide hollow nanoparticles are manufactured by a chemical vapor condensation method. Metal β-diketonate is used as a precursor, and a hollow structure of the metal oxide nanoparticles is formed as the precursor is decomposed sequentially. The instability of precursor during decomposition provides a profitable environment that hollow structure can be formed. The instability is determined only when nucleation and growth rate of crystalline phase is faster than the decomposition rate of organic groups from precursor by the sequential decomposition. This sequential decomposition does not take place when other volatile metal organic precursors including organic groups, which decompose concurrently, are used as a precursor. Metal acetylacetonate is the desirable precursor of metal β-diketonates. Though following describes the method to synthesize metal oxide hollow nanoparticles using metal acetylacecetonate as a precursor, present invention includes all metal β-diketonates showing the sequential decomposition behavior of organic group, as precursors.

Figure 5:
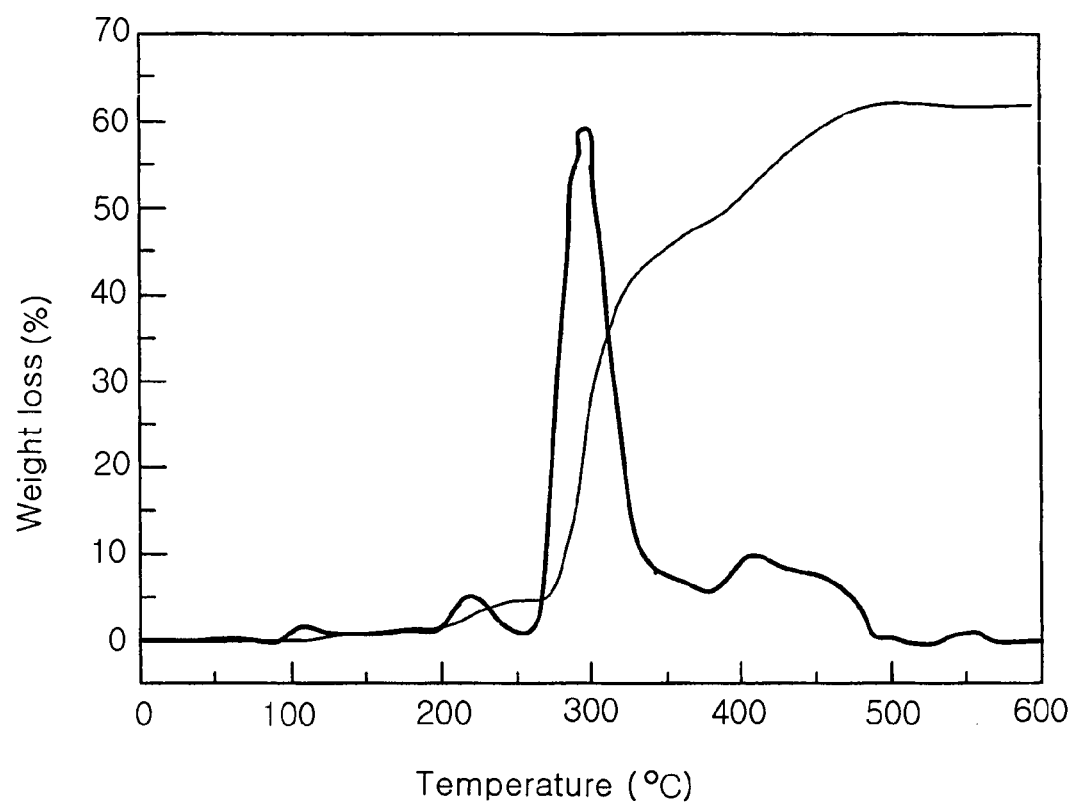
FIG. 5 is a graph showing thermal decomposition behavior of iron (III) acetylacetonate based on thermogravimetry.

FIG. 5 shows analysis results on thermal decomposition behavior of iron (III) acetylacetonate, which is used for synthesizing the aforementioned metal oxide hollow nanoparticles, based on thermogravimetry.

As shown, when iron (III) acetylacetonate is decomposed, acetylacetonate $(C_5H_7O_2)$ groups are decomposed sequentially at the reaction temperatures of approximately 220° C., approximately 300° C. and approximately 400° C. It is exemplified in the exemplary embodiment of the present invention that metal β-diketonate such as metal acetylacetonate, which can be decomposed sequentially with increasing temperature, is used as a precursor.

Using metal β-diketonate as the precursor can exclude dependency on process characteristics and control crystalline phase and particle size with adjusting process parameters without prior or post treatments. Thus, preparation of metal acetylacetonate is necessary to manufacture metal oxide hollow nanoparticles according to the exemplary embodiment of the present invention.

The metal acetylacetonate has a structure that metal or metal oxide is combined with the acetylacetonate groups, and can be selected from those materials that allow the acetylacetonate groups to be decomposed sequentially as the reaction temperature increases. The metal acetylacetonate can be selected from a group consisting of: iron (III) acetylacetonate, aluminum acetylacetonate, titanium (IV) oxide acetylacetonate, cerium (III) acetylacetonate, hydrate, chromium (III) acetylacetonate, cobalt (II) acetylacetonate, copper (II) acetylacetonate, gallium (III) acetylacetonate, manganese (III) acetylacetonate, iron (II) acetylacetonate, magnesium acetylacetonate, hydrate, barium acetylacetonate, hydrate, beryllium acetylacetonate, cadmium acetylacetonate, hydrate, calcium acetylacetonate, cesium acetylacetonate, indium (III) acetylacetonate, iridium (III) acetylacetonate, lanthanum acetylacetonate, hydrate, lead (II) acetylacetonate, lithium acetylacetonate, manganese (II) acetylacetonate, nickel (II) acetylacetonate, palladium (II) acetylacetonate, platinum (II) acetylacetonate, rhodium (III) acetylacetonate, rubidium acetylacetonate, ruthenium (III) acetylacetonate, silver acetylacetonate, vanadium (III) acetylacetonate, vanadyl acetylacetonate, yttrium (III) acetylacetonate, hydrate, zinc acetylacetonate hydrate, and zirconium (IV) acetylacetonate.

The metal acetylacetonate can be prepared in powder or in slurry mixed with organic solvent. The slurry type can be preferably used when metal oxide hollow nanoparticles are manufactured consecutively. For the preparation of the metal acetylacetonate in slurry, it is necessary to dissolve the precursor into a proper organic solvent. Although the organic solvent can be any solvent that can dissolve the metal acetylacetonate, it is preferable to use solvent that has low a boiling point and high solvency with respect to metal organic compounds. Examples of such organic solvent are isopropyl alcohol, ethyl alcohol, methyl alcohol, acetone, and nucleic acids. Among these examples, isopropyl alcohol is preferable. Since metal acetylacetonate generally has a low level of solubility with respect to an organic solvent, the organic solvent used to make the precursor in slurry should have good mobility and a lower decomposition temperature (i.e., the boiling point) than a melting point of the precursor.

The aforementioned isopropyl alcohol is a material widely used as a solvent or denaturant and has a boiling point of approximately 108° C. and good solvency, and thus being suitable for preparing the precursor in slurry employed to produce the above metal acetylacetonate consecutively. Also, it is possible to achieve relatively a complete decomposition of the precursor within a certain reaction region.

The slurry is consecutively injected for a long time through a micro-pump for the purpose of a continuous supply of the precursor when metal oxide hollow nanoparticles are massively manufactured. With consideration of this fact, it is preferable to have a low concentration of metal acetylacetonate (i.e., high level fluidity). However, if the concentration of metal acetylacetonate is too low, productivity of metal oxide hollow nanoparticles is diminished. Thus, the concentration of metal acetylacetonate within the slurry is set to be in an appropriate range, preferably, in a range of 0.1 M to 0.5 M.

The metal acetylacetonate prepared as above is evaporated at a temperature greater than the melting point. As mentioned above, evaporation temperature of precursor is the most effective variable on the formation of hollow structure and it should be determined to induce the instability of precursor. The evaporation temperature of the metal acetylacetonate is preferably in a range between a melting point of approximately 20° C. to approximately 30° C. and a boiling point of approximately 20° C. to approximately 30° C. If the evaporation temperature is too higher than the boiling point, the bonds between metal ions and acetylacetonate groups are broken completely, whereby the sequential decomposition of the acetylacetonate groups for forming hollow nanoparticles may not be take place. If the evaporation temperature is too low, droplets of the precursor may not be generated.

The evaporated metal acetylacetonate is transferred to the aforementioned reaction region. Preferably, a carrier gas is used for this transfer of the evaporated metal acetylacetonate. Helium (He) and argon (Ar) are examples of the carrier gas.

The evaporated metal acetylacetonate transferred into the reaction region is thermally decomposed. As simultaneous to this thermal decomposition, the evaporated metal acetylacetonate reacts with oxygen to thereby synthesize metal oxide hollow nanoparticles. The reaction temperature and pressure within the reaction region is preferably higher than approximately 500° C. and less than approximately 600 mbar.

If the reaction temperature is too low, the metal oxide hollow nanoparticles are synthesized in amorphous state without forming a crystalline phase. For this reason, the reaction temperature is preferably higher than approximately 500° C., and the maximum reaction temperature can be set considering potential particle growth caused by sintering or thermal coagulation of the metal oxide hollow nanoparticles. For instance, as like aluminum oxide, when the complete crystalline phase is formed at a temperature of higher than approximately 1,000° C., the maximum reaction temperature can be set at approximately 1,500° C.

If the reaction pressure is too high, the collision rate between the metal oxide hollow nanoparticles increases, thereby resulting in particle growth, which causes a generation of numerous agglomerated particles. For this reason, the reaction pressure is preferably set at approximately 600 mbar.

If the reaction pressure is too low, the decomposition rate of the acetylacetonate groups increases, thereby resulting in a higher probability of no generation of the metal oxide hollow nanoparticles. Thus, the reaction pressure is preferably set in a range of approximately 50 mbar to approximately 600 mbar.

The above synthesized metal oxide hollow nanoparticles are condensed and collected. The condensation of the synthesized metal oxide hollow nanoparticles is preferably carried out such that the condensation takes place by thermophoretic particles from vapor which is overly saturated as the temperature decreases abruptly.

According to the exemplary embodiment of the present invention, metal oxide hollow nanoparticles with particle sizes of less than approximately 100 nm, particularly, less than approximately 50 nm and a narrow particle size distribution. Such metal oxide hollow nanoparticles have various functional characteristics including mechanical, magnetic, chemical, optical, electrical, and electronic characteristics distinguished from the conventionally manufactured powders with sizes of several hundreds of nanometers.

The metal oxide hollow nanoparticles prepared in powder exist preferably in the form of monodispersion instead of agglomeration. The hard agglomeration should be avoided, and soft agglomeration is preferable in order to be easily monodispersed by a chemical or physical method. The metal oxide hollow nanoparticles prepared in powder in the form of monodispersion or agglomeration with weak agglomeration force can be manufactured in various types including dispersed particles, thin films or thick films.

Figure 1:
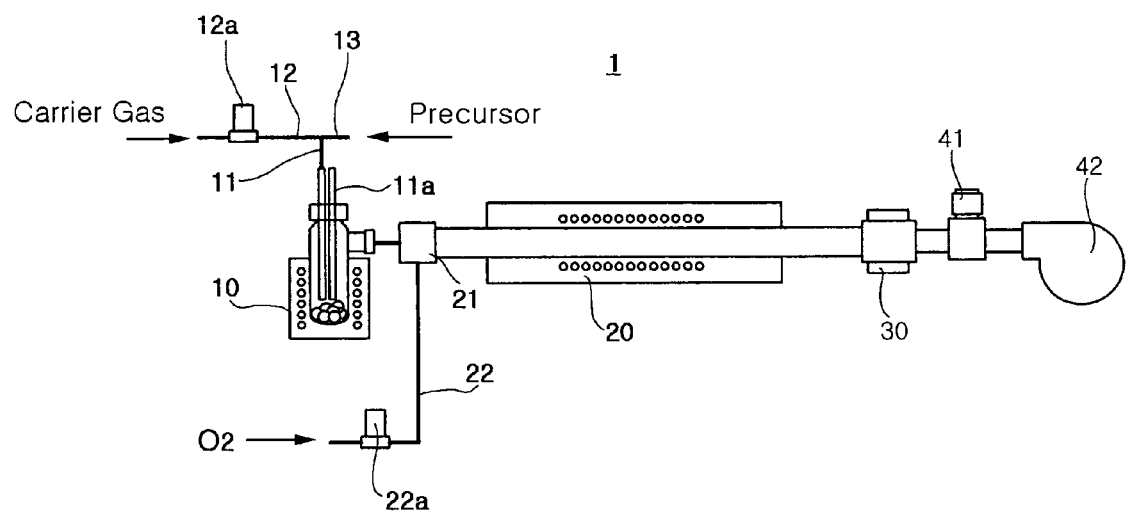
FIG. 1 is a schematic view illustrating an apparatus for manufacturing metal oxide hollow nanoparticles in accordance with an exemplary embodiment of the present invention, the apparatus being suitable for a chemical vapor condensation process.

FIG. 1 is a schematic view illustrating an apparatus for manufacturing metal oxide hollow nanoparticles to which an exemplary embodiment of the present invention can be applied.

The apparatus 1 includes: an evaporator 10; a reactor 20; and a collector 30. The evaporator 10 evaporates metal acetylacetonate, which is a precursor. The reactor 20 thermally decomposes the evaporated metal acetylacetonate and simultaneously, synthesizes metal oxide hollow nanoparticles through a reaction with oxygen. The collector 30 condenses the synthesized gaseous metal oxide hollow nanoparticles and collects the condensed metal oxide hollow nanoparticles.

A transfer pipe 11 is connected with the evaporator 10 to supply a carrier gas and a precursor to the evaporator 10. The transfer pipe 11 is connected with a carrier gas supplying pipe 12 for supplying the carrier gas and with a precursor supplying pipe 13 for supplying the precursor. The carrier gas supplying pipe 12 includes a carrier gas flow controller 12a. The transfer pipe 11 includes a thermocouple 11a.

The reactor 20 includes a mixer 21 at the front side when viewed from a moving direction of a reaction gas. The mixer 21 is connected with an oxygen supplying pipe 22 for supplying oxygen, which includes a reaction gas flow controller 22a for controlling a flow amount of oxygen.

Also, in FIG. 1, reference numerals 41 and 42 represent a pressure controller and a vacuum pump, respectively.

Hereinafter, a method for manufacturing metal oxide hollow nanoparticles using the above apparatus according to the exemplary embodiment of the present invention will be described in detail.

A precursor is supplied to the evaporator 10 through the precursor supplying pipe 13 and the transfer pipe 11, and the evaporator 10 evaporates the precursor. A carrier gas supplied through the carrier gas supplying pipe 12 and the transfer pipe 11 transfers the evaporated precursor to the mixer 21 of the reactor 20. The transferred precursor vapor is mixed with oxygen supplied through the oxygen supplying pipe 22 and synthesized into metal oxide hollow nanoparticles as the precursor vapor is thermally decomposed and oxidized by the supplied oxygen, i.e., the reaction gas, within the reactor 20. Then, the collector 30 condenses the synthesized gaseous metal oxide hollow nanoparticles and collects the condensed metal oxide hollow nanoparticles.

Hereinafter, a first specific embodiment of the present invention will be described in detail with reference to the drawings.

The above apparatus described in FIG. 1 was used to manufacture metal oxide hollow nanoparticles in the first specific embodiment of the present invention.

Approximately 3 g of iron (III) acetylacetonate, used as a precursor, was put into the evaporator 10. Considering that the melting point of the supplied iron (III) acetylacetonate is approximately 183° C., the evaporator 10 was maintained at approximately 200° C. to evaporate the iron (III) acetylacetonate.

Figure 2:
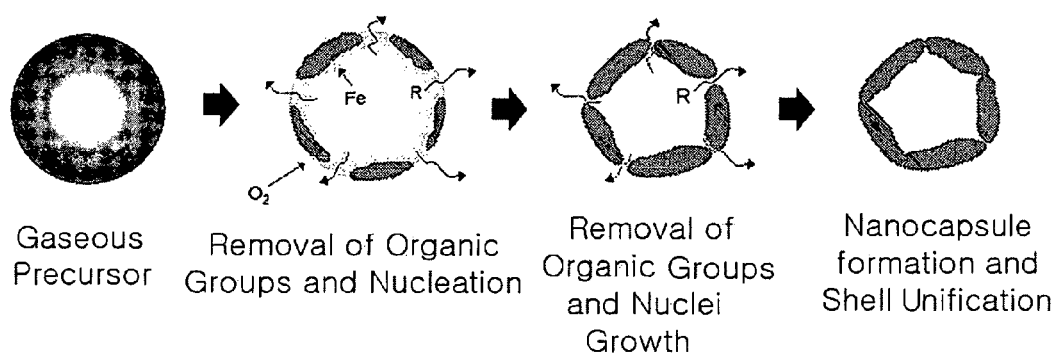
FIG. 2 is a schematic view showing the concept of metal oxide hollow nanoparticle synthesis mechanism in accordance with an exemplary embodiment of the present invention.

The evaporated precursor was transferred to the reactor 20 using helium, which was a carrier gas, and thermally decomposed as well as reacted with oxygen (i.e., an oxidization reaction). As a result of these reactions, iron oxide hollow nanoparticles were synthesized. Particularly, FIG. 2 shows the result of observing the above described synthesis. The reaction temperature was varied within a range of approximately 700° C. to approximately 900° C., and the reaction pressure was varied within a range of approximately 200 mbar to approximately 600 mbar.

The synthesized iron oxide hollow nanoparticles were condensed and collected by the collector 30 to obtain iron oxide hollow nanoparticles.

Characteristics of the above iron oxide hollow nanoparticles such as phase, crystallite size, average particle size, and existence or absence of a hollow structure were carefully analyzed. Table 1 shows the analysis results.

Figure 3A:
FIG. 3A is a transmission electron microscopy (TEM) micrograph showing iron oxide hollow nanoparticles manufactured at the reaction temperature of 700° C. using iron (III) acetylacetonate as a precursor in accordance with a first specific embodiment of the present invention.
Figure 3B:
FIG. 3B is a TEM micrograph showing iron oxide hollow nanoparticles manufactured at the reaction temperature of 800° C. using iron (III) acetylacetonate as a precursor in accordance with a first specific embodiment of the present invention.
Figure 3C:
FIG. 3C is a TEM micrograph showing iron oxide hollow nanoparticles manufactured at the reaction temperature of 900° C. using iron (III) acetylacetonate as a precursor in accordance with a first specific embodiment of the present invention.
Figure 3D:
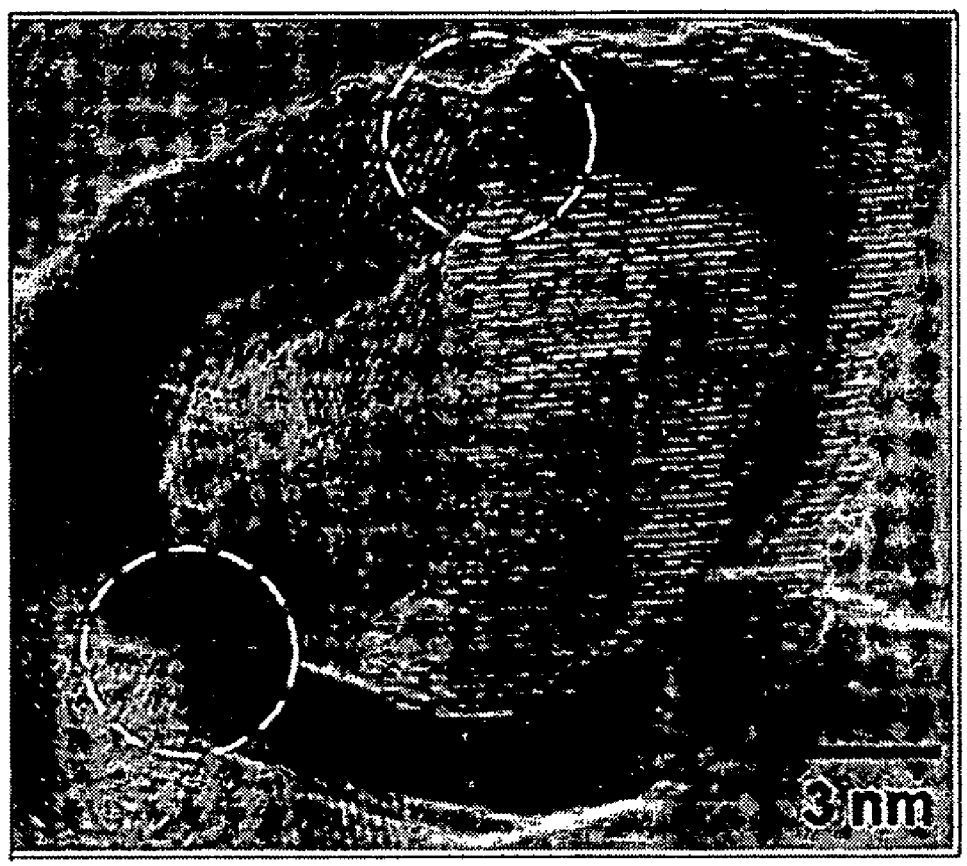
FIG. 3D is a photograph of high resolution electron microscopy (HREM) on the iron oxide hollow nanoparticles shown in FIG. 3B.
Figure 4A:
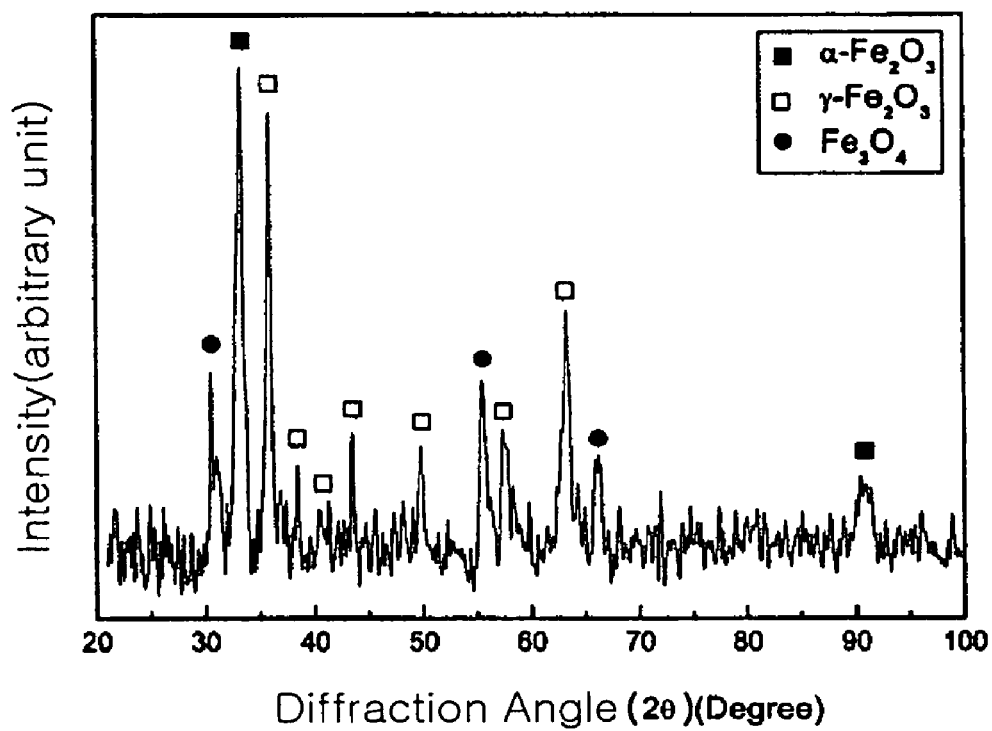
FIG. 4A shows an X-ray diffraction pattern of iron oxide hollow nanoparticles manufactured at the reaction temperature of 700° C. in accordance with a first specific embodiment of the present invention.
Figure 4B:
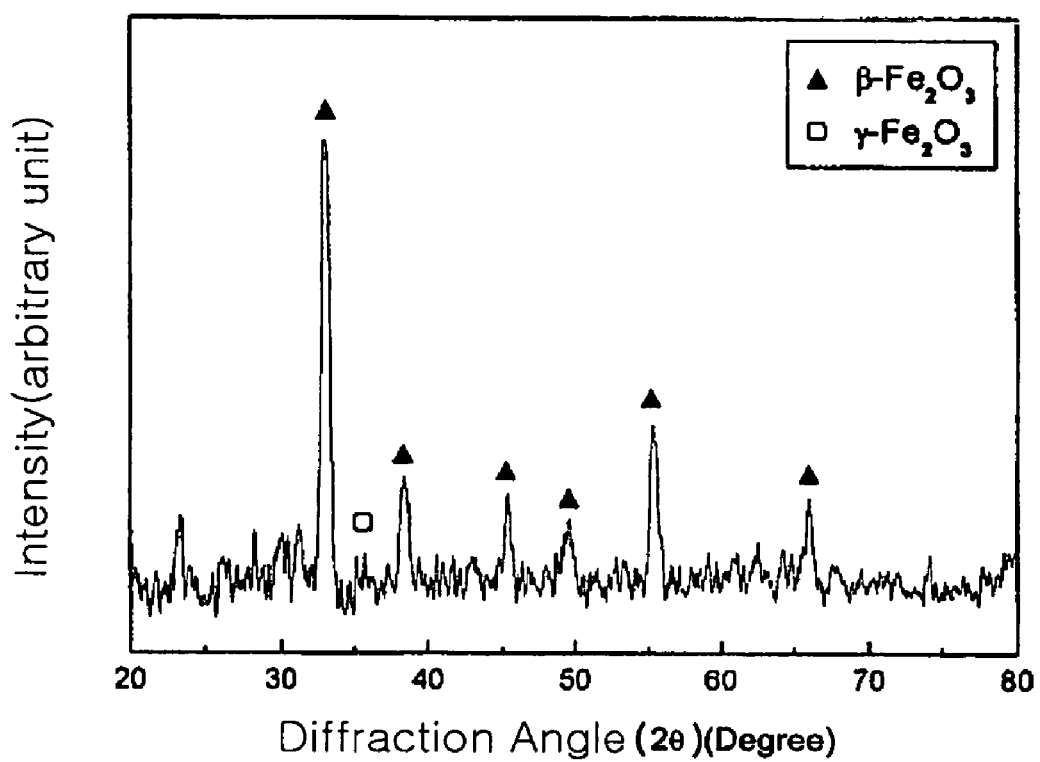
FIG. 4B shows an X-ray diffraction pattern of iron oxide hollow nanoparticles manufactured at the reaction temperature of 800° C. in accordance with a first specific embodiment of the present invention.
Figure 4C:
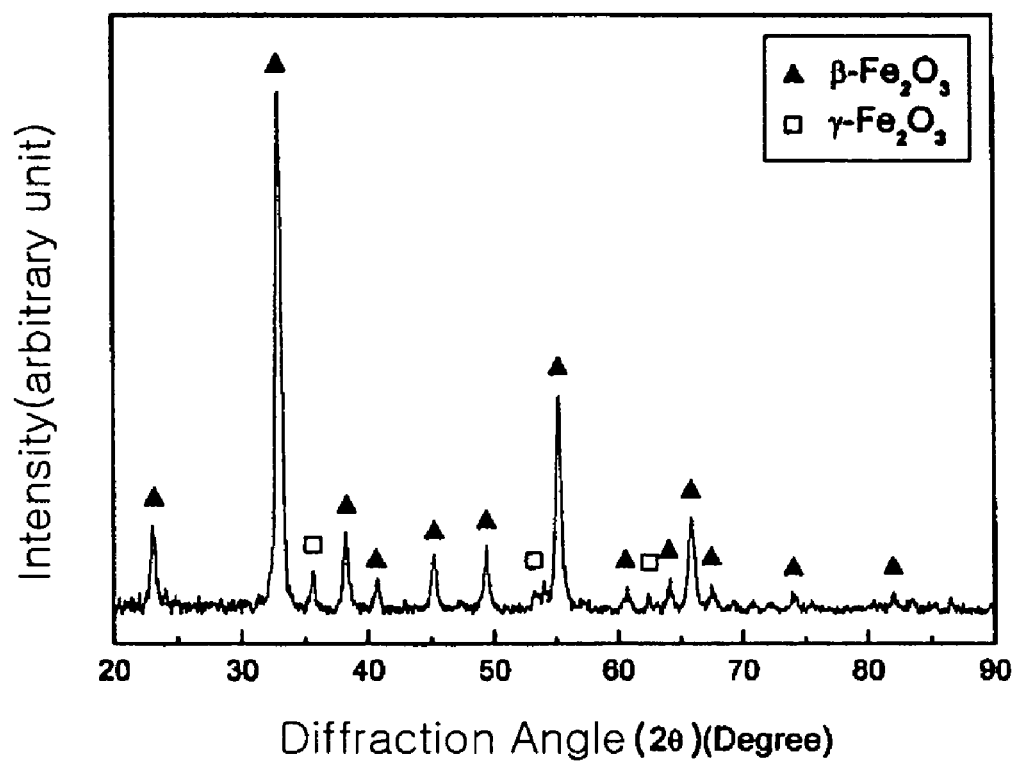
FIG. 4C shows an X-ray diffraction pattern of iron oxide hollow nanoparticles manufactured at the reaction temperature of 900° C. in accordance with a first specific embodiment of the present invention.

Also, FIGS. 3A to 3C are transmission electron microscopy (TEM) micrographs showing iron oxide hollow nanoparticles. FIG. 3d is a photograph of high resolution electron microscopy (HREM) on the iron oxide hollow nanoparticles shown in FIG. 3B. Also, X-ray diffraction patterns on the above photographs were analyzed and the results were shown in FIGS. 4A to 4C.

The micrographs of the iron oxide hollow nanoparticles shown in FIGS. 3A to 3C were obtained by inducing the reaction at 700° C., 800° C. and 900° C. The analysis results shown in FIGS. 4A to 4C were obtained by inducing the reaction at approximately 700° C., approximately 800° C. and approximately 900° C.

Table 1 mentioned above is set forth herein.

TABLE 1

| Reaction Temp. (° C.) | Phase | Crystallite Size (nm) | Average Particle Size (nm) | Precursor | Existence of Hollow |
|---|---|---|---|---|---|
| 700 | $\alpha$-$Fe_2O_3$ | 10 | ≦35 | $Fe(C_5H_7O_2)_3$ | Yes |
|  | $\gamma$-$Fe_2O_3$ | 21 |  |  |  |
|  | $Fe_3O_4$ | 21 |  |  |  |
| 800 | $\beta$-$Fe_2O_3$ | 13 | ≦20 | $Fe(C_5H_7O_2)_3$ | Yes |
| 900 | $\beta$-$Fe_2O_3$ | 18 | ≦20 | $Fe(C_5H_7O_2)_3$ | Yes |
|  | $\gamma$-$Fe_2O_3$ | 19 |  |  |  |

As illustrated in FIG. 2, the hollow structure according to the exemplary embodiment of the present invention is formed based on a reciprocal relationship among a decomposition rate of the acetylacetonate groups of the precursor, nucleation of metal oxide phase on the droplet surface and a growth rate of metal oxide particles.

As shown in Table 1 and FIGS. 3A to 3D, the particle size of iron oxide hollow nanoparticles was in a range of less than approximately 35 nm. As shown in FIG. 3D, the aforementioned iron oxide hollow nanoparticles had approximately 2 to 3 shells with thicknesses of approximately 3 nm to approximately 5 nm. Each shell has a different crystallographic orientation.

With reference to Table 1 and FIGS. 4A to 4D, the iron oxide hollow nanoparticles had various crystalline phases and a certain average crystallite size depending on the reaction temperature.

Hereinafter, a comparative example for the first specific embodiment of the present invention will be described in detail.

In the comparative example, iron oxide nanoparticles were manufactured as same as the first specific embodiment except for usage of an iron pentacarbonyl ($Fe(CO)_5$) group as a precursor. The reaction temperature was approximately 800° C.

Figure 6A:
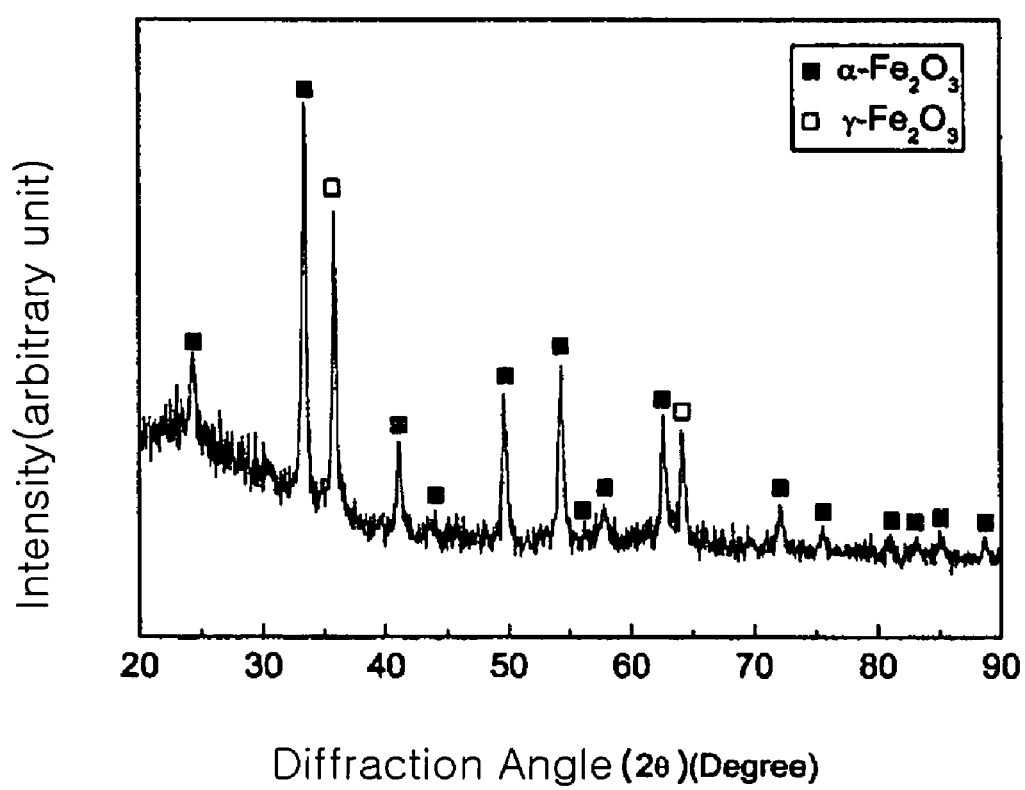
FIG. 6A shows an X-ray diffraction pattern of iron oxide hollow nanoparticles manufactured using iron pentacarbonyl, $(Fe(CO)_5)$ as a precursor in accordance with a comparative example.
Figure 6B:
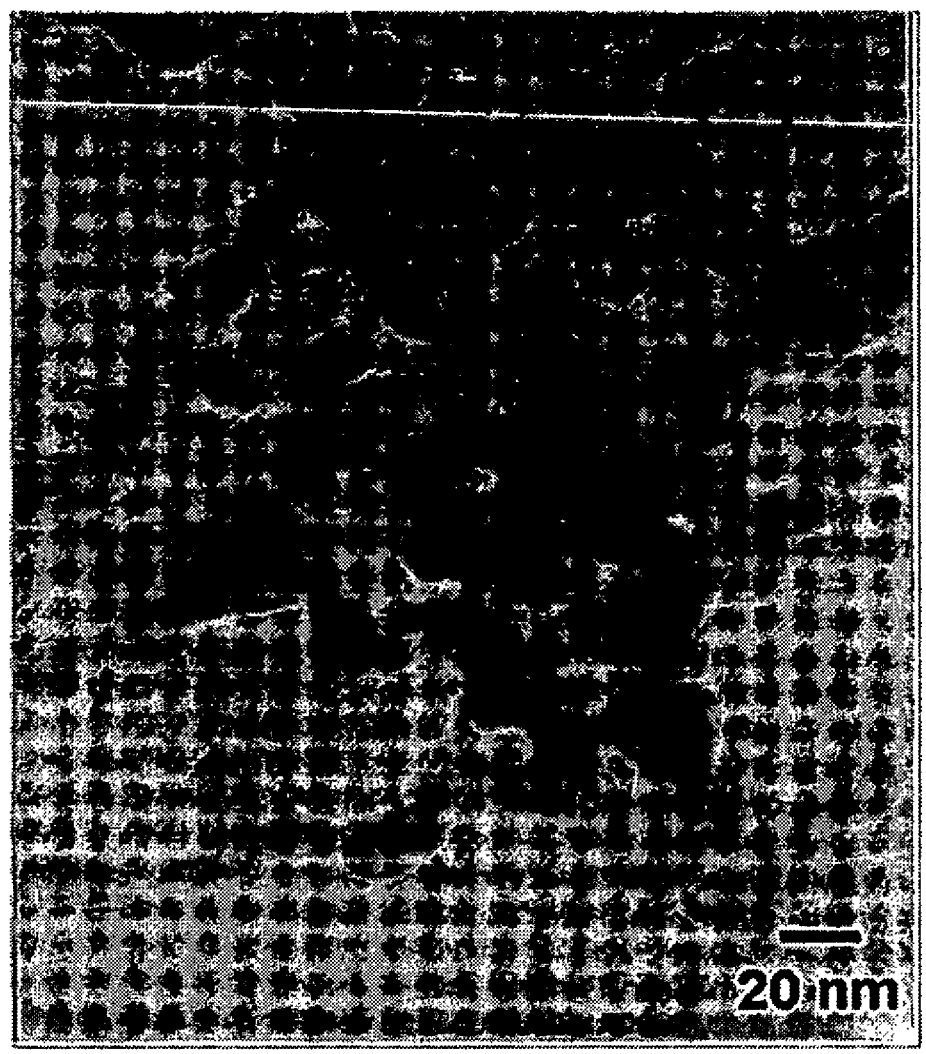
FIG. 6B is a TEM micrograph showing iron oxide hollow nanoparticles manufactured using iron pentacarbonyl as a precursor in accordance with a comparative example.

FIG. 6A shows the result of X-ray diffraction pattern analysis on the iron oxide nanoparticles manufactured according to a comparative example, while FIG. 6B shows TEM images of the iron oxide nanoparticles manufactured according to a comparative example.

As shown in FIGS. 6A and 6B, when the iron oxide nanoparticles were manufactured using the iron pentacarbonyl group, crystalline phases of $\alpha$-$Fe_2O_3$ and $\gamma$-$Fe_2O_3$ were observed but not hollow structure.

These results verifies that the hollow structure of the iron oxide hollow nanoparticles manufactured according to the first specific embodiment is formed when the iron (III) acetylacetonate is thermally decomposed as illustrated in FIG. 2.

Hereinafter, detailed description of a second specific embodiment of the present invention will be provided.

The second specific embodiment shows the case of manufacturing titanium oxide hollow nanoparticles as same as the first specific embodiment in the exception that: titanium (IV) oxide acetylacetonate was used as a precursor; the evaporation temperature was 220° C.; the melting point was 200° C.; and the reaction temperature and pressure were 900° C. and 400 mbar, respectively.

Figure 7A:
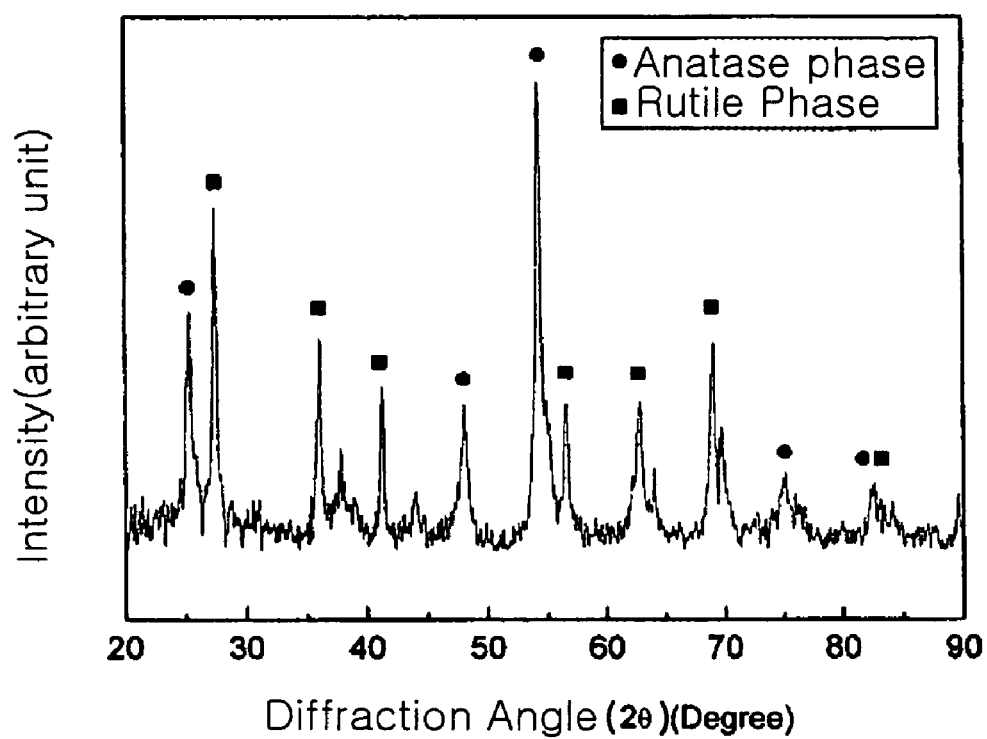
FIG. 7A shows an X-ray diffraction pattern of titanium oxide hollow nanoparticles manufactured using titanium(IV) oxide acetylacetonate as a precursor in accordance with a second specific embodiment of the present invention.
Figure 7B:
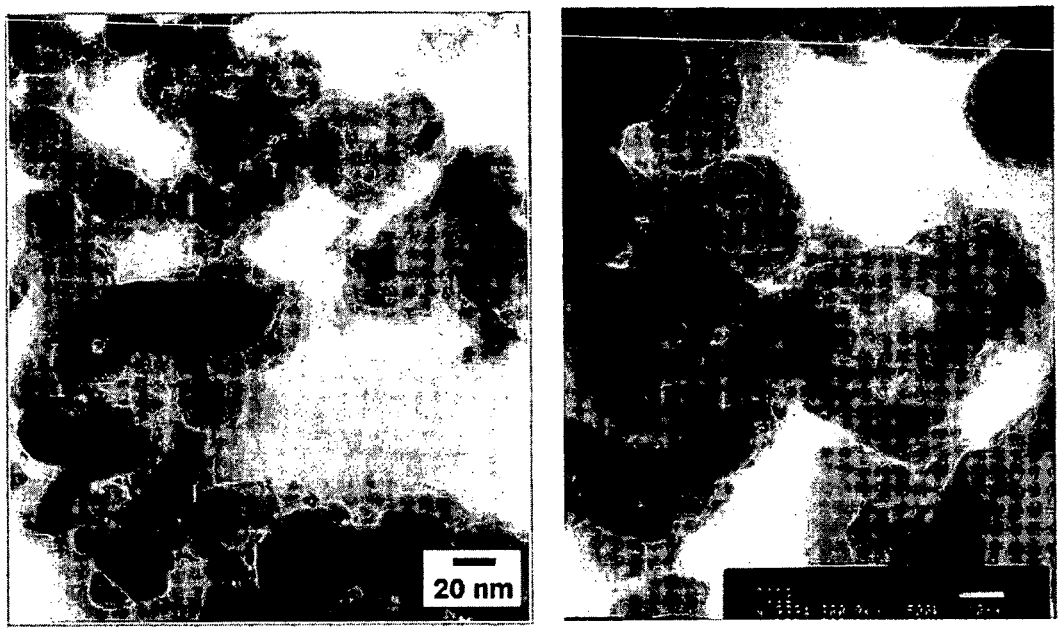
FIG. 7B shows TEM micrographs of titanium oxide hollow nanoparticles manufactured using titanium (IV) oxide acetylacetonate as a precursor in accordance with a second specific embodiment of the present invention.

FIG. 7A shows the result of X-ray diffraction pattern analysis on the titanium oxide hollow nanoparticles manufactured according to a second specific embodiment, while FIG. 7B shows TEM images of the titanium oxide hollow nanoparticles manufactured according to a second specific embodiment.

As shown in FIG. 7A, the synthesized titanium oxide hollow nanoparticles prepared in powder included anatase phase and rutile phase together, and the phase ratio of these two phase types was 4 to 6, indicating that a volume ratio of the rutile phase was larger than that of the anatase phase. An average crystallite size of the anatase phase was 19 nm, while that of the rutile phase was 24 nm. The average crystallite size was calculated based on the Scherrer formula.

With reference to FIG. 7B, the synthesized titanium oxide nanoparticles had a hollow structure and a particle size within a range of less than approximately 40 nm.

According to a third specific embodiment, another case of manufacturing metal oxide hollow nanoparticles will be described hereinafter.

In the third embodiment, aluminum oxide hollow nanoparticles were manufactured using the same method as described in the first specific embodiment in the exception that: aluminum acetylacetonate was used as a precursor; the evaporation temperature and the melting point were 330° C. and 315° C., respectively; the reaction temperature was in a range of 850° C. to 1,000° C.; and the reaction pressure was 400 mbar.

Figure 8A:
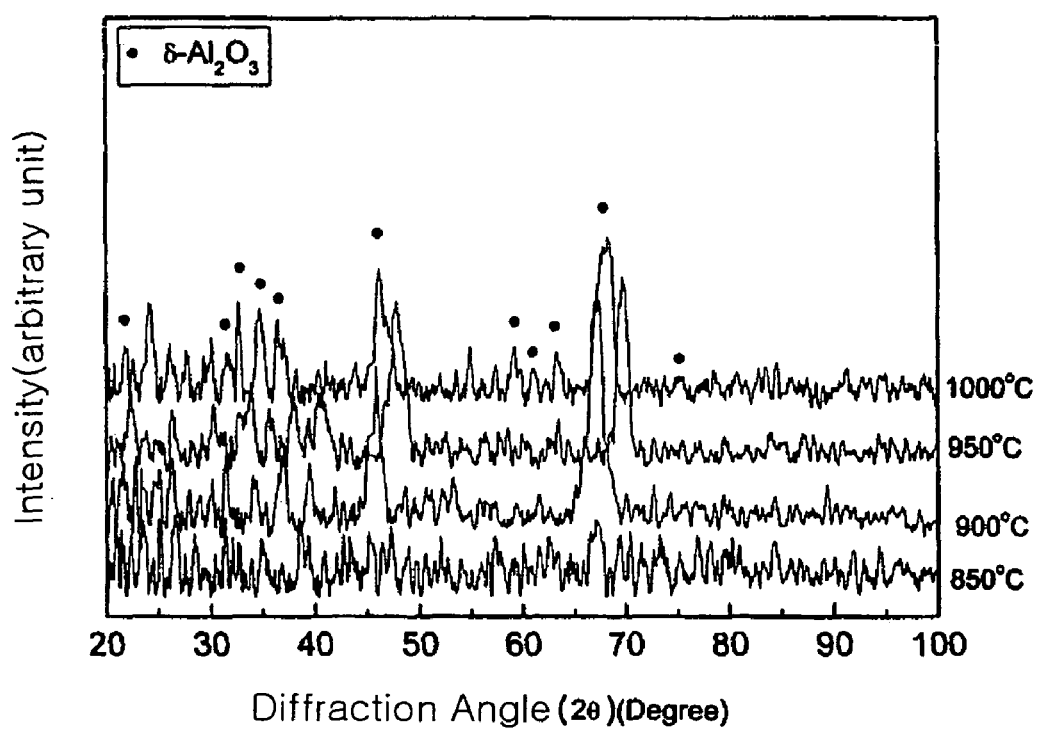
FIG. 8A shows X-ray diffraction patterns of aluminum oxide hollow nanoparticles manufactured using aluminum acetylacetonate as a precursor in accordance with a third specific embodiment of the present invention.
Figure 8B:
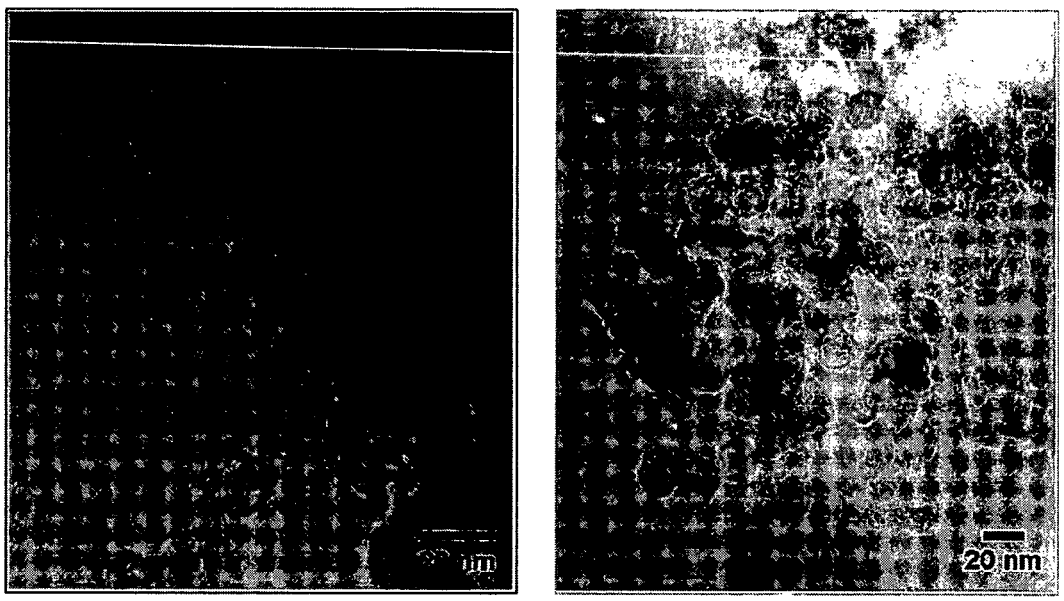
FIG. 8B shows TEM micrographs of aluminum oxide hollow nanoparticles manufactured using aluminum acetylacetonate as a precursor in accordance with a third specific embodiment of the present invention.

FIG. 8A shows the result of X-ray diffraction pattern analysis on the aluminum oxide hollow nanoparticles manufactured according to a third specific embodiment, while FIG. 8B shows TEM images of the aluminum oxide hollow nanoparticles manufactured according to a third specific embodiment.

Referring to FIG. 8A, the aluminum oxide nanoparticles prepared in powder were synthesized at 850° C., 900° C., 950° C., and 1,000° C. and the synthesized aluminum oxide nanoparticles had δ-$Al_2O_3$ phase.

Referring to FIG. 8B, the synthesized aluminum oxide nanoparticles had a hollow structure and particle size within a range of less than 20 nm.

According to the exemplary embodiment and specific embodiments of the present invention, hollow nanoparticles can be manufactured using a precursor that does not rely on process types but uses a thermal decomposition characteristic.

Also, it is possible to obtain metal oxide hollow nanoparticles with a fine average particle size of less than approximately 100 nm, more specifically, less than approximately 50 nm and with a narrow particle size distribution. Therefore, compared with the conventional metal oxide nanoparticles with particle sizes of greater than several hundreds nanometers, the synthesis of smaller hollow nanoparticles causes changes in particle properties. Accordingly, the metal oxide hollow nanoparticles according to the exemplary and specific embodiments of the present invention can have various applications.

The conventional hollow nanoparticles are used to the field of carriers or catalysts based on low density and large specific surface area. However, hollow nanoparticles according to the exemplary and specific embodiments of the present invention have larger specific surface area and electronic and chemical characteristics in addition to optical characteristics. Thus, the hollow nanoparticles can be suitably applied to high technological areas using nanotechnology.

Particularly, considering that more than 60 kinds of metal acetylacetonate have been used in numerous industrial fields, the exemplary and specific embodiments of the present invention show the numerous possible cases of manufacturing various metal oxide hollow nanoparticles without any limitation in hollow nanoparticle types generally appeared in the conventional manufacturing processes.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for manufacturing a metal oxide hollow nanoparticle using a chemical vapor condensation process, the method comprising:
   preparing metal acetylacetonate as a precursor;
   evaporating the metal acetylacetonate at a predetermined temperature, the predetermined temperature higher than a melting point of metal acetylacetonate;
   transferring the evaporated metal acetylacetonate into a reaction region having a reaction temperature ranging from approximately 500° C. to approximately 1,500° C., and wherein the reaction region has a reaction pressure that is sufficiently high to induce generation of metal oxide hollow nanonparticles, the sufficiently high reaction pressure ranging from 200 mbar to 600 mbar;
   thermally decomposing the transferred metal acetylacetonate vapor and simultaneously inducing a reaction of the transferred metal acetylacetonate vapor with oxygen to synthesize the metal oxide hollow nanoparticles; and
   condensing and collecting the synthesized metal oxide hollow nanoparticles, wherein an average particle size of the synthesized metal oxide hollow nanoparticles is less than approximately 100 nm.

2. The method of claim 1, wherein the metal acetylacetonate is selected from a group consisting of: iron (III) acetylacetonate, aluminum acetylacetonate, titanium (IV) oxide acetylacetonate, cerium (III) acetylacetonate hydrate, chromium (III) acetylacetonate, cobalt (II) acetylacetonate, copper (II) acetylacetonate, gallium (III) acetylacetonate, manganese (III) acetylacetonate, iron (II) acetylacetonate, magnesium acetylacetonate hydrate, barium acetylacetonate hydrate, beryllium acetylacetonate, cadmium acetylacetonate hydrate, calcium acetylacetonate, cesium acetylacetonate, indium (III) acetylacetonate, iridium (III) acetylacetonate, lanthanum acetylacetonate hydrate, lead (II) acetylacetonate, lithium acetylacetonate, manganese (II) acetylacetonate, nickel (II) acetylacetonate, palladium (II) acetylacetonate, platinum (II) acetylacetonate, rhodium (III) acetylacetonate, rubidium acetylacetonate, ruthenium (III) acetylacetonate, silver acetylacetonate, vanadium (III) acetylacetonate, vanadyl acetylacetonate, yttrium (III) acetylacetonate hydrate, zinc acetylacetonate hydrate, and zirconium (IV) acetylacetonate.

3. The method of claim 1, wherein the metal acetylacetonate is prepared in powder.

4. The method of claim 1, wherein the predetermined temperature is a range between a melting point plus approximately 20° C. to 30° C. and a boiling point plus approximately 20° C. to 30° C. of the metal acetylacetonate.

5. A method for manufacturing a metal oxide hollow nanoparticle using a chemical vapor condensation process, the method comprising:
   preparing a precursor including metal acetylacetonate;
   evaporating the precursor at a given temperature, the given temperature higher than a melting point of metal acetylacetonate;
   transferring, on a carrier gas, the evaporated precursor into a reaction chamber, the reaction chamber having a temperature between approximately 500° C. and approximately 1,500° C., and wherein the reaction chamber has a reaction pressure that is sufficiently high to induce generation of metal oxide hollow nanonparticles, the sufficiently high reaction pressure above 200 mbar and below 600 mbar;
   thermally decomposing the transferred precursor in the reaction chamber and inducing a reaction of the transferred precursor with oxygen to synthesize the metal oxide hollow nanoparticles; and
   condensing and collecting the synthesized metal oxide hollow nanoparticles, wherein an average particle size of the synthesized metal oxide hollow nanoparticles is less than approximately 100 nm.

6. The method of claim 5, wherein the metal acetylacetonate is selected from a group consisting of: iron (III) acetylacetonate, aluminum acetylacetonate, titanium (IV) oxide acetylacetonate, cerium (III) acetylacetonate hydrate, chromium (III) acetylacetonate, cobalt (II) acetylacetonate, copper (II) acetylacetonate, gallium (III) acetylacetonate, manganese (III) acetylacetonate, iron (II) acetylacetonate, magnesium acetylacetonate hydrate, barium acetylacetonate hydrate, beryllium acetylacetonate, cadmium acetylacetonate hydrate, calcium acetylacetonate, cesium acetylacetonate, indium (III) acetylacetonate, iridium (III) acetylacetonate, lanthanum acetylacetonate hydrate, lead (II) acetylacetonate, lithium acetylacetonate, manganese (II) acetylacetonate, nickel (II) acetylacetonate, palladium (II) acetylacetonate, platinum (II) acetylacetonate, rhodium (III) acetylacetonate, rubidium acetylacetonate, ruthenium (III) acetylacetonate, silver acetylacetonate, vanadium (III) acetylacetonate, vanadyl acetylacetonate, yttrium (III) acetylacetonate hydrate, zinc acetylacetonate hydrate, and zirconium (IV) acetylacetonate.

7. The method of claim 5, wherein the precursor is prepared in powder.

8. A method for manufacturing a metal oxide hollow nanoparticle using a chemical vapor condensation process, the method comprising:
   preparing metal acetylacetonate as a precursor;
   evaporating the metal acetylacetonate at a predetermined temperature, the predetermined temperature higher than a melting point of metal acetylacetonate;
   transferring the evaporated metal acetylacetonate into a reaction region having a reaction temperature ranging from approximately 500° C. to approximately 1,500° C., and wherein the reaction region has a reaction pressure that is sufficiently high to induce generation of metal oxide hollow nanonparticles, the sufficiently high reaction pressure ranging from 200 mbar to 600 mbar;
   thermally decomposing the transferred metal acetylacetonate vapor and simultaneously inducing a reaction of the transferred metal acetylacetonate vapor with oxygen to synthesize the metal oxide hollow nanoparticles; and
   condensing and collecting the synthesized metal oxide hollow nanoparticles.

9. The method of claim 1, wherein the predetermined temperature is a range between a melting point plus approximately 20° C. to 30° C. and a boiling point plus approximately 20° C. to 3020 C. of the metal acetylacetonate.

\* \* \* \* \*